(12) United States Patent
Osburn, III

(10) Patent No.: US 8,019,546 B1
(45) Date of Patent: Sep. 13, 2011

(54) TSUNAMI MONITORING SYSTEM

(75) Inventor: Douglas C. Osburn, III, Houston, TX (US)

(73) Assignee: DJ Inventions, LLC, Houston, TX (US)

( * ) Notice: Subject to any disclaimer, the term of this patent is extended or adjusted under 35 U.S.C. 154(b) by 720 days.

(21) Appl. No.: 12/098,545

(22) Filed: Apr. 7, 2008

Related U.S. Application Data

(63) Continuation-in-part of application No. 11/345,759, filed on Feb. 2, 2006, now abandoned, which is a continuation-in-part of application No. 11/050,170, filed on Feb. 3, 2005, now Pat. No. 7,587,481, and a continuation-in-part of application No. 11/050,516, filed on Feb. 3, 2005, said application No. 11/050,170 is a continuation-in-part of application No. 09/826,578, filed on Apr. 5, 2001, now Pat. No. 6,950,851, said application No. 11/050,516 is a continuation-in-part of application No. 09/826,578, filed on Apr. 5, 2001, now Pat. No. 6,950,851.

(60) Provisional application No. 60/649,795, filed on Feb. 3, 2005.

(51) Int. Cl.
*G01W 1/00* (2006.01)

(52) U.S. Cl. ............. 702/3; 73/170.31; 340/539.28

(58) Field of Classification Search ............. 702/2, 3, 702/5; 73/170.29, 170.31, 170.34; 116/107; 340/539.26, 539.28
See application file for complete search history.

(56) References Cited

U.S. PATENT DOCUMENTS 6,628,992 B2 * 9/2003 Osburn, III ............. 700/9

FOREIGN PATENT DOCUMENTS

JP 53098861 A * 8/1978

OTHER PUBLICATIONS

Milburn et al. "Real-time Tsunami Reporting from Deep Ocean" Sep. 23-26, 1996, Oceans '96 MTS/IEEE 'Prospects for the 21st Century, Conference Proceedings, vol. 1, pp. 390-394.*

* cited by examiner

*Primary Examiner* — Manuel L Barbee
(74) *Attorney, Agent, or Firm* — Buskop Law Group, PC; Wendy Buskop

(57) ABSTRACT

A system of detecting tsunami conditions using communications for a supervisory control and data acquisition (SCADA) system. The SCADA system comprises an enterprise server, and a RTU. The RUT includes a sensor that continuously collect information. The system includes a buoy adapted communicate with the RTU. The buoy can include a transceiver, and wherein the transceiver communicates with the enterprise server. Communication software (AES) links the enterprise server to the buoy. The communication software can be adapted to simultaneously handle multiple types of telemetry and different SCADA protocols of the buoys; and wherein the communication software initiates an alarm when the information associated with oceanic conditions signifies tsunami conditions.

14 Claims, 4 Drawing Sheets

TSUNAMI MONITORING SYSTEM

CROSS REFERENCE TO RELATED APPLICATIONS

The present application is a Continuation-in-Part application which claims priority to co-pending U.S. patent application Ser. No. 11/345,759, filed Feb. 2, 2006, which claims priority to the Provisional Patent Application No. 60/649,795, filed on Feb. 3, 2005. The present application also claims priority to the co-pending U.S. patent application Ser. No. 11/050,170 and U.S. patent application Ser. No. 11/050,516, both filed on Feb. 3, 2005 and claim priority to the U.S. patent application Ser. No. 09/826,578, filed Apr. 5, 2001, which Issued as U.S. Pat. No. 6,950,851 on Sep. 27, 2005.

FIELD

The embodiments relate to integrated automation system that has utility in the monitoring of tsunami conditions and environmental monitoring.

BACKGROUND

Tsunamis are natural disasters that can kill thousands of people living in coastal regions. There are no current detection systems that can communicate with the various sensor buoys that are in use today. The automation industry has had major developments in the implementation of supervisory control and data acquisition (SCADA) monitoring and control systems. A need has long existed for an integrated system, which uses small PC's to communicate with buoys.

The integration problems were rampant in the industry. Either, hosts were inadequate or defective. A unique enterprise server was developed to facilitate the integration of software.

A vital part of any system utilized for process control, data acquisition, or alarm detection and notification, is the initial communication and periodic point-to-point communication of the system, including the process input values, the database, the displays and the like. Such a communication procedure is associated with a SCADA system, which in its most generic definition is essentially a process control system. The components of a typical SCADA system comprise a SCADA device and one or more remotely connected Intelligent Electronic Devices. As used herein, the term SCADA device is used as convenient shorthand for what may be a collection of electronic equipment, including a computer based controller, which can be a server, also termed the "enterprise server" that is used to remotely monitor communication and/or control the operation of one or more remote buoys. In general, the enterprise server is located miles away from the buoy presenting many SCADA system communication difficulties. However, such a definition should not preclude an enterprise server being located much closer.

Communication for a SCADA system traditionally has been very time and labor intensive. The initial set up of the buoy required an expensive technician to go to the buoy at sea to configure the buoy. Subsequent maintenance communication has also been particularly time and labor intensive where the buoy is in an extremely remote location. In such a case, transportation and communication problems have been abundant. Therefore, reducing the time and effort required to run communication of a SCADA system while insuring that the SCADA device database and overall SCADA system operation meets the highest possible accuracy standards, which would provide substantial cost advantages over current communication procedures.

Traditionally, buoy configuration has involved assembling and transporting to the buoy location a collection of complex and expensive test equipment and signal generators that are required to produce the needed configuration. The configuration next required an expensive technician at the remote location to inject the data into the buoy inputs and a second expensive technician at the central location(s) to verify the buoy is processing correctly according to the new configuration.

Such a system presents many drawbacks. For example, two technicians at disparate locations are required to perform the service. Moreover, in most SCADA systems, the buoy must be disconnected from the process that the buoy is monitoring and/or controlling, which may affect the process under control.

A need exists for methods and apparatus that address the shortcomings of present communication of a SCADA system. A need has existed for an improved system that can communicate with buoys through different telemetry methods and that can talk to buoys from different countries and manufactures that utilize different protocols. A need has existed for a system, which works faster than traditional host systems.

The embodiments meet these needs.

The following terms are used herein. The term "SCADA" means Supervisory Control and Data Acquisition Systems. The term "ARME" means the buoy configuration or maintenance tool for the SCADA system. ARME is an OPC Client that communicates through the AES that allows buoy's to be remotely reconfigured after deployment. OPC MESSENGER combines with AES to provide a data acquisition front-end for relational databases. The term "OPC MESSENGER" means The AutoSol Connection, which is a data acquisition front end connection for databases. The term "GEL" means Generic Encapsulation Layer.

BRIEF DESCRIPTION OF THE DRAWINGS

The detailed description will be better understood in conjunction with the accompanying drawings as follows.

Figure 1:
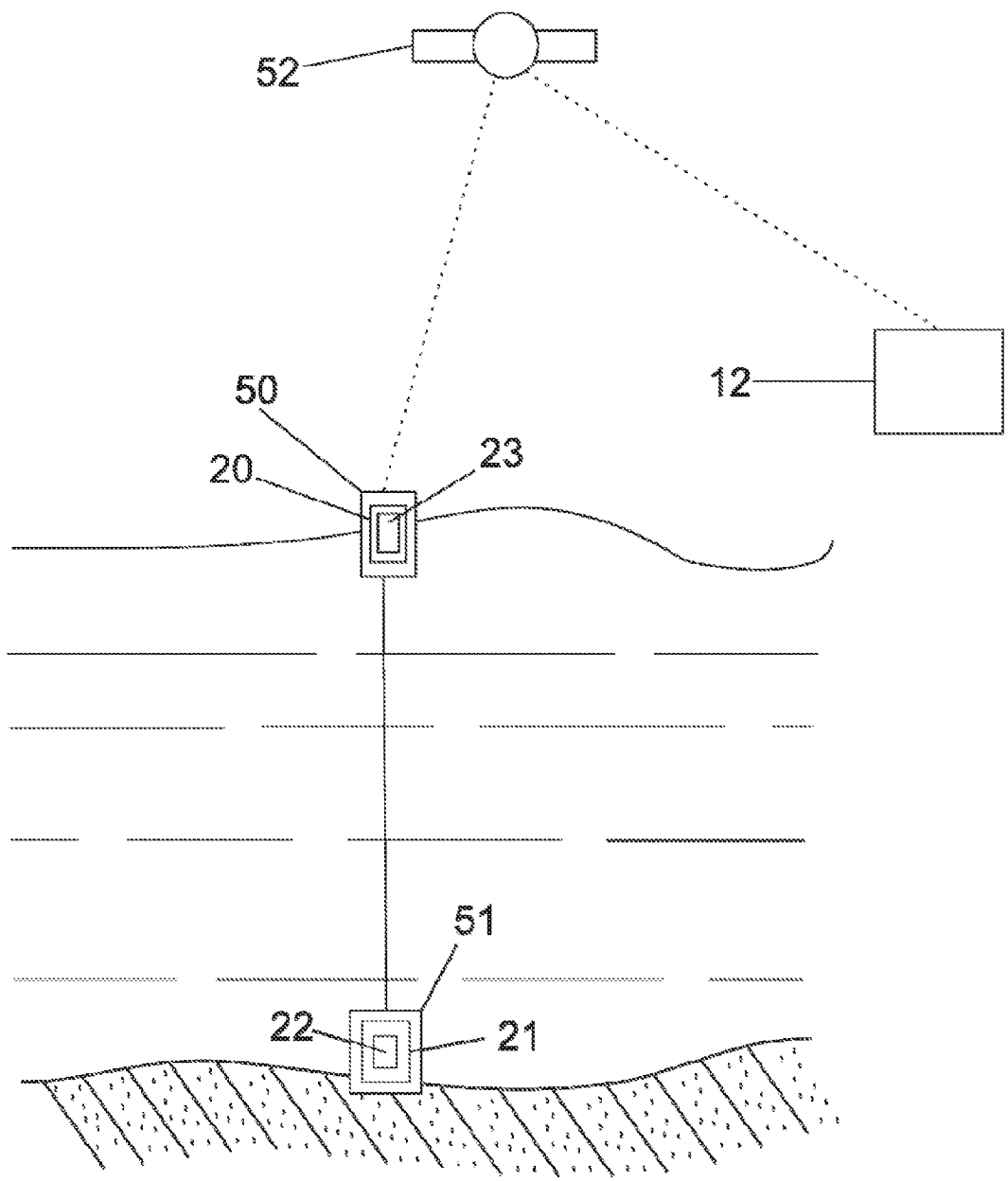
FIG. 1 depicts an embodiment of a single buoy as part of the embodied tsunami detection and warning systems.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that it can be practiced or carried out in various ways.

According to an embodiment, an integrated automation system has utility in the monitoring of tsunami conditions and environmental monitoring will now be described with reference to the Figures. Those of ordinary skill in the art will recognize that the description given herein with respect to those Figures is for exemplary purposes only and is not intended in any way to limit the scope of the claimed subject matter.

Tsunamis are natural disasters that can kill thousands of people living in coastal regions. Currently detection systems that can communicate with the various sensor buoys that are in use today are not available. The automation industry has had major developments in the implementation of supervisory control and data acquisition (SCADA) monitoring and control systems. By being able to communicate with various types of sensor buoys, the embodied systems can detect a tsunami more quickly and more accurately than current systems in order to allow a warning to be communicated to persons residing in a surrounding coastal region, so that an evacuation can take place saving hundreds if not thousands of lives.

Embodied systems of detecting tsunami conditions using communications for a supervisory control and data acquisition (SCADA) system can include two or more buoys connected to an enterprise server. Each buoy includes at least one remote terminal unit (RTU). The RTU includes a sensor that continuously collects information about oceanic conditions. Examples of sensors include pressure sensors, temperature sensors, salinity sensors, transducers, anemometers, and combinations thereof. The buoy houses the RTU and protects the RTU from surface oceanic conditions. A submersible buoy can be adapted to protect a second RTU from oceanic conditions at the bottom of the ocean. The second RTU located in the submersible buoy can be in communication with the RTU located in the buoy by acoustic signal, cable, or other method of communicating through large bodies of water.

The RTU can further includes an analog-to-digital converter (ADC) for measuring the physical data collected by the sensors and can convert the information into a digital representation of the collected oceanic information. The RTU can include a memory area for storing digital representations and a processor in communication with the ADC and the memory area. The processor operates upon the digital representations according to a predetermined function. The processor can selectively move the digital representations to the memory area. The RTU can include a command register for storing communication commands. The command register can be in communication with the processor. The processor can move the digital representations to the memory area when the command register contains an enabling communication command. A bidirectional port can be included in the RTU and be in communication with the AES and enterprise server for transmitting the digital representations to the enterprise server from the RTU via the AES.

The buoy can include a transceiver connected to the RTU. The transceiver can enable the RTU to communicate with a compatible transceiver connected to the enterprise server. The buoy can include a second transceiver connected to the RTU, which is usually an acoustical transceiver. The second transceiver can enable the RTU to communicate with a compatible transceiver connected to the second RTU in the submersible buoy.

The embodied systems include communications software (AES) that can link the enterprise server to the RTU in the buoy. The communication software can be used to link the second RTU in the submersible buoy through the various transceivers. Any or all of the RTUs located in the buoy or submersible buoys can be in communication with the communication software (AES) in various known manners (for example, by satellite signals, acoustic signals, radio frequency, or combinations thereof).

The communication software can be adapted to simultaneously handle multiple types of telemetry for communication with buoys and submersible buoys. The communication software is adapted to simultaneously handle different communication protocols of other buoys from different countries and manufactures. The communication software can initiate an alarm when the information collected by the sensors in the RUT in the buoys associated signifies tsunami conditions. The collected information by one or more RTUs can include changes in water pressure, changes in water temperature, salinity, pollutant concentration, velocity and direction of water currents.

The communication software can continue communicating with each buoy while an additional enterprise server can be added or removed from the SCADA system. The communication software continues communicating with each buoy while a new buoy is added or removed from the SCADA system.

A configuration software (ARME) can be added for configuring and reconfiguring the RTU. The configuration commands can be communicated from ARME to the RTU located in the buoy and the second RTU located in the submersible buoy using the AES.

It is contemplated that the submersible buoy can have two transceivers for simultaneously communicating with the surface buoy and directly with the enterprise server.

With reference to the Figures, FIG. 1 depicts an embodiment of a single buoy as part of the embodied tsunami detection and warning systems. The example system includes an enterprise server 12, a submersible buoy 51 containing a RTU 21 at the bottom of the ocean to detect a physical condition through a sensor 22, wherein the sensor and RTU 21 continuously collect information. The example system includes a buoy 50 comprising another RTU 20 at the surface of the ocean to detect a physical condition through a sensor 23. The RTU 20 and sensor continuously collect information. The RTU 20 can be adapted to communicate with the first RTU 21. The RTU 20 in the buoy 50 can simultaneously communicate with the enterprise server 12. The communication link between RTU 20 located in the buoy 50 and RTU 21 located in the submersible buoy 51 can be through different types of telemetry including communication methods using acoustical signals.

Communication software (AES) links the enterprise server to the RTU 20 located in the buoy. The connection between the enterprise sever 12 and the RTU 20 can be through a satellite 52. Other forms of communication are also possible including acoustic signal, radio frequency, or combinations thereof. In addition to communication with RTU 20 in buoy 50, the communication software is adapted to simultaneously handle multiple types of telemetry and different protocols of other buoys from different countries and manufacturers. The communication software initiates an alarm when the information associated with oceanic conditions signifies tsunami conditions.

A configuration software (ARME) can be used for configuring and reconfiguring the RTU 20, wherein the configuration commands are communicated using the AES.

Figure 2:
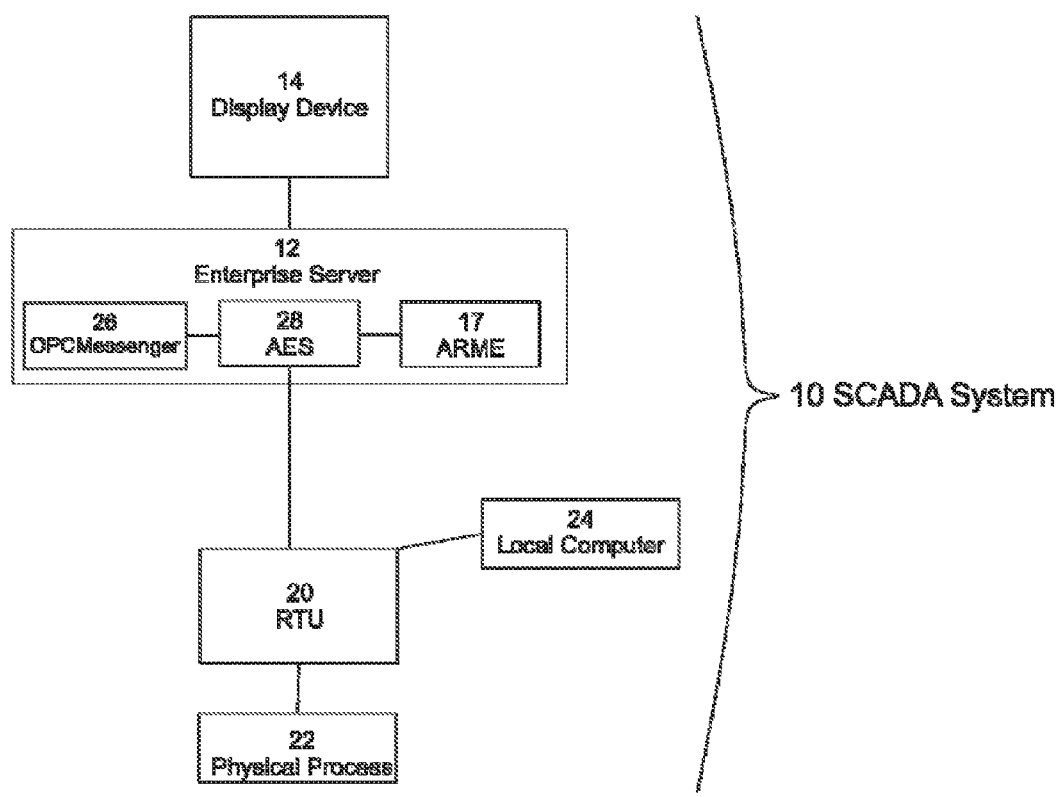
FIG. 2 depicts an embodiment of a supervisory control and data acquisition (SCADA) employed in the embodied tsunami detection and warning systems

FIG. 2 depicts an embodiment of a supervisory control and data acquisition (SCADA) employed in the embodied tsunami detection and warning systems. As shown, the SCADA system 10 comprises an enterprise server 12 and has a display device 14 for displaying data to a human operator (not shown in the figure). A second enterprise server (not shown) can optionally be connected to the SCADA system 10 which may have a second display device connected to the second enterprise server.

An RTU 20, such as a microprocessor-based relay, connects to the system. The RTU can monitor and/or control a physical process 22. An optional local computer 24 can be used for configuring RTU 20 locally.

RTU 20 can communicate with enterprise server 12 via a connection called OPC messenger 26. OPC messenger 26 can reside on server 12 as shown in FIG. 1. In another embodiment, the OPC messenger 26 can reside on the local computer 24. In another embodiment, OPC messenger 26 or AES 28 can be on either of the two computers 12 and 24. The use of two computers is an example. The systems can be configured to use more or less than two computers 12 and 24 for the AES 28 to reside on. The AES provides the RTU 20 with simulation or diagnostic instructions so the RTU can run tests without the need for an operator or expensive test equipment to inject a new configuration of a RTU into system 10. Moreover, each RTU 20 can continue to monitor while the simulation or diagnostic is running.

Configuration of the RTU 20 can occur by use of a configuration tool ARME 17 the can reside on either of the computers 12 and 24, but in the figures is depicted on enterprise server 12. The ARME 17 configures the RTU 20 through the AES 28. The OPC messenger 26 and the ARME 17 can be on their own enterprise servers and separate from the enterprise server the AES 28 is installed on. The OPC messenger 26 and the ARME 17 can still connect to the AES 28 to communicate with the RTU 20.

The RTU can run diagnostic tests as directed by the enterprise server 12 or 14 based on instruction via the AES. The diagnostic and configuration tests of the RTUs, the SCADA system 10 require communication with each RTU 20 using one or more enterprise servers.

Figure 3:
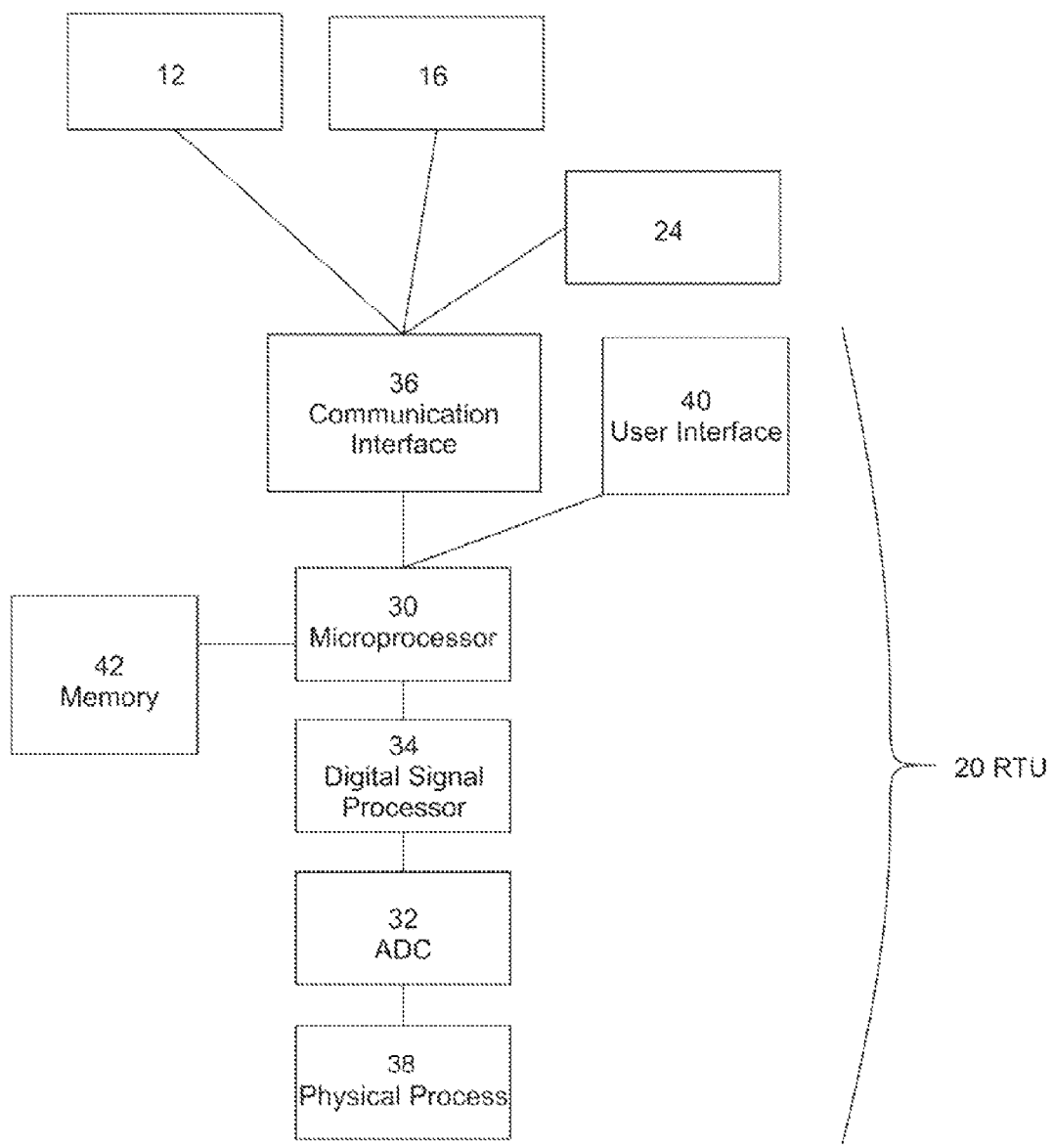
FIG. 3 depicts an embodiment of a buoy employed in the embodied tsunami detection and warning systems.

FIG. 3 depicts an embodiment of a buoy employed in the embodied tsunami detection and warning systems. As exampled in FIG. 3, the essential parts of RTU 20 comprise a microprocessor 30, an analog-to-digital converter (ADC) 32, a digital signal processor 34, and a communication interface 36 (for example, a bi-directional port or one or more directional input ports or output ports). The input and output ports can be an Ethernet adapter, a serial communication port, or a modem. A user interface 40 provides displace and command entry features. The microprocessor 30 has a memory area 42. Memory area 42 can comprise both Read-Only Memory (ROM) and Random Access Memory (RAM). Computers 12, 16, and 24 can connect to the communication interface 36 of the RTU 20.

A watchdog timer can be used with the SCADA device. The watchdog timer is a relay that is reset during every cycle of the AES software, in which the relay communicates with the processor for restarting the RTU.

As with many standard RTUs such as the microprocessor-based relay, RTU 20 measures aspects of a physical process 38 such as currents and voltages and converts the measured values into a digital equivalent via an analog to digital converter. Microprocessor 30 moves the digital representation of the measured values into memory area 42 where the data can be accessed by programs and external devices such as an enterprise server. Moreover, microprocessor 30 can perform various predetermined functions on the data, such as fault detection as in the case of a relay, or control the process. Microprocessor 30 is also in communication with communication interface 36, the AES so that data (i.e., digital representative data) can be transferred to an external device such as enterprise server 14 or 16 or both, or even more servers.

An input/output interface 36 is coupled to microprocessor 30 and provides binary input signals from a controlling device. The RTU 20 can provide control signals to the controlling device such as a breaker close or open signal if the controlling device is a circuit breaker.

Figure 4:
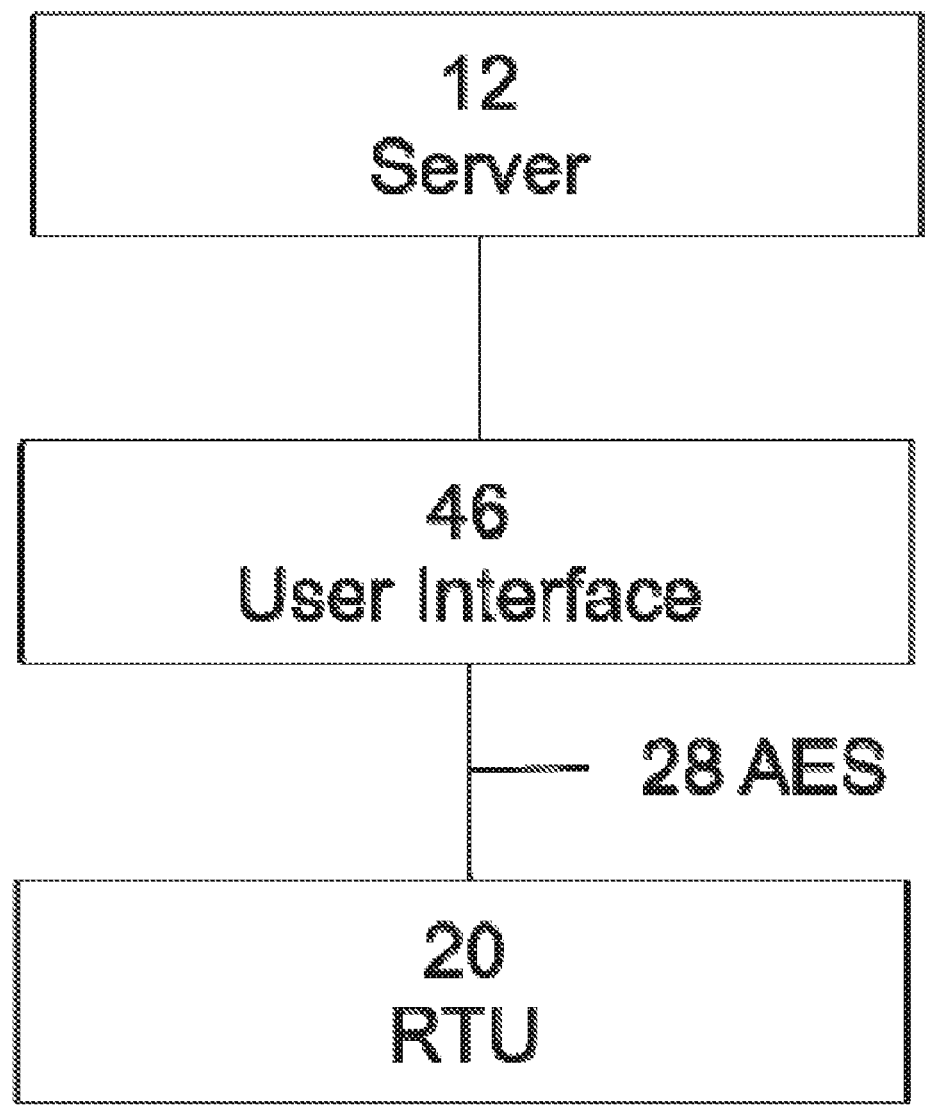
FIG. 4 is a flow chart of an embodiment of a user interface usable with an enterprise server employed in the embodied tsunami detection and warning systems.

FIG. 4 is a flow chart of an embodiment of a user interface usable with an enterprise server employed in the embodied tsunami detection and warning systems. For reconfiguration while an RTU is on line, a user interface 46 can provide input parameters to the RTU via an input device such as a keyboard or a keypad at the server 12 through the AES 28 to the RTU 20. The user interface 40 can provide a local mechanism for gaining access to the data in memory 42. In this way, a local operator can provide initial configuration data to RTU 20 or check the status of data within memory 42. Additionally, interface 46 can display communication data from the RTU allow a user to change the values for the data stored in the RTU. Alternatively, this same user interface 46 can initiate steps to place RTU 20 is in a simulation or test mode.

The user interface 46 can provide another mechanism to command RTU 20 and place RTU 20 either "off line" or into a "sleep mode". The user interface 46 can be used to remove specific tasks by interval or entirely from the task list initially installed in the RTU. This same interface permits additional tasks to be added to the RTU. If a task is deleted from the RTU, or if the RTU is put into periodic "wake up" mode, the RTU can not store data in memory, or transmit. Additionally, the user interface 46 can interacts with the AES program 28 to permit a user to request internal diagnostics from the RTU to determine the internal status of RTU 20 (for example, a memory failure or processor failure while all other RTU and servers remain on line).

During normal operation, a metering module writes metered values to register memory. An input/output task writes binary status values to register memory. The register memory values written by metering module and input/output task are, then transmitted to the enterprise server for further processing. As described above, the communication port communicates with the AES and controls the interaction between RTU and enterprise server. For clarity and brevity, the communication process is described in reference to communication interface.

The embodiments relate to communication technology that can simultaneously handle multiple types of telemetry and different protocols from various remote terminal units. The embodied systems are a server-based systems that can provide information to a wide variety of client server interfaces. The only limitation on capacity is bandwidth and processing power.

For example, the embodied system can handle the communication for detecting tsunami or abnormal conditions in large bodies of water. Multiple servers of the can be used. The servers can be used in parallel to each other and enable millions of terminals to receive and transmit communications to a central server and enable the utility to configure millions of buoys at once.

The AES communication system is capable of handling communication systems with over 100,000 buoys and to diagnostics while continuing non-stop communication with no downtime. The AES component enables the user to add or delete buoys while continuing to operate and function on line. This AES component enables the user to add, remove, or replace additional servers without downtime.

The AES is essentially a windows-based OPC server with object linking and embedding for process control that communicates with numerous buoys simultaneously. The embodied systems relate to a window based communication servers that permits digital communication to a field device. The systems enable the user to connect or disconnect digitally any one or more of the buoys while the system is operating on line. The system contemplates that thousands of buoys can be engageable and disengageable while the system is on line. The system includes computers suitable for performing remote automation in environmentally exposed locations using software compatible with the common operating systems (For example, Windows 98™, NT™ and 2000™ operating systems).

The hardware in the embodiments is capable of performing remote control, alarm detection, data acquisition, and data management functions. The software provides communication to buoy's via telemetry systems, acquired data management via commercially available databases (for example, Oracle, Microsoft Access, Microsoft SQL server, and Cybase) and buoy status and performance values and parameters to data centers.

The AES can run as an NT server. The AES has connection modules that are connected from a standard port. The AES generally includes TCPIP, dialup, and/or serial ports. Other modules can be added depending on the hardware interface. For example, ARC NET connection modules can be added as well as protocol modules.

The AES is compatible with common operating systems (For example, Window 2000™ or Windows NT™). AES supports communication with various buoys and other vendor products through a computer serial port or network card. Other software packages can communicate with the buoy through AES and its DDE (Dynamic Data Exchange) or OPC (OLE for Process Control) Server interface.

The AES can communicate without an OPC request from an external Client. The AES can provide more deterministic performances as real-time data items are constantly active. The data collected can be cached for delivery to external Client applications via the server interface. The AES can provide standalone history/archived data uploads from field devices for storage in database or audit files without the requirement of an external client. AES can support redundant telemetry channels/methods to a single device.

The SCADA system can include ARME, AES, and/or OPC MESSENGER. The ARME is the RTU configuration or maintenance tool for the SCADA system. The ARME is communicates through the AES and allows each RTU to be remotely reconfigured after deployment. Examples of the AES include communication software that is an NT Service and configuration software that is an ActiveX Control. The OPC MESSENGER combines with AES to provide a data acquisition front-end for relational databases. The OPC MESSENGER can have an ODBC interface that is compatible with all leading relational database products.

The configuration software can merge with any other software that is an Active X container to allow modification of the communication software. The configuration software has features that allow the remote configuration of the communication software, such as over the Internet. The configuration software provides a set of windows that allows the end user to define the communication desired with the RTU. For example, if a client wants to communicate with a "Totalflow" instrument, a window allows the user to set up the connection type, and then set up a virtual port associated with that connection type. A Windows Interface allows the user to select a serial connection type or serial port, and define multiple virtual ports, which are associated with an actual port, such as a COM Port 1. Next, the user selects a protocol, such as Modbus. The user can then define a device, which is to be communicated with via the Modbus protocol. All communication parameters are then selected and then the communication software is setup for communication with the device through the port.

The configuration software can modify an offline database where the interface is OLE DB. This feature allows the invention to be compatible with any relational database. When a new device is selected, or new parameters are entered, the changes that are made to the offline database are automatically assimilated by the communication software.

Communication can be established between a Microsoft Windows base computer and a buoy immediately upon powering the RTU and without RTU configuring or programming.

As an example, automation functionality in the buoy can setup through the following manner. An automation function to be executed in the buoy from the functions available in an ARME program is selected along with additional parameters associated with the specific function, if necessary. The automation function is communicated from ARME through the AES to the buoy. Optional functions can be added to a function map and portions or the entire function map can be communicated from ARME through the AES to the buoy. Optional functions can be added to a function map and communicate from ARME through AES simultaneously to many buoy's. The automation function then reconfigures existing buoys via the AES with new function maps simultaneously.

One or more library of function blocks can be included in each map. The ARME can have a customizable function block ability to enable end users to self develop and customize function blocks with a VB language. The ARME can overwrite a simulation environment to simulate a function map in a host computer prior to loading the function map in a buoy. The ARME can download function maps to buoy; upload function maps from buoy's; and synchronize to one or more buoy's with the internal computer clock.

The buoy can have a software component termed "the soft buoy" which is loaded on the hardware, the "buoy hardware." The soft buoy can have a special operating system, which executes on the function maps, which are downloaded to the buoy.

The buoy can supports the modbus protocol standards and can monitor millions of buoy addresses. The buoys can provide exception reporting; scatter reads (registers do not have to be contiguous); mixed data type messaging, and security or access privileges configurable per port (for example, read only, read/write status, or read/write/configure status).

An example dimension of the buoy can be 6.14 W×11.5 L×1.35H with mounting plate. The firmware of the buoy's control, data acquisition, alarm and event, and data logging capabilities can be configured with the buoy Maintenance Environment (ARME). In addition all hardware options can be configured from ARME. Hardware jumpers, switches or plug-ins are typically not required.

A hardware interface layer can be included with the embodied systems. The hardware layer can be a Generic Encapsulation Layer or GEL. This hardware interface contains all the low-level communication programs, which enable the soft buoy to communicate with the Enterprise server. Some of these programs include, timing programs, communication buffers, I/O scanners, memory management, real time clock, power management routines.

To operate the soft RTU, controls in individual function blocks indicate to the operating system of the soft buoy when they should execute. The default configuration of the soft buoy enables immediate communication of the buoy with SCADA system at the moment of power up. Access to all I/O points on the RTU is also granted at the moment of power up. The RTU can of the buoy to put itself to sleep, based on change of status. The buoy can be set to wake up periodically, or be woken up by telephone. The buoy can be put to sleep periodically as well. Very little power is required by the buoy when the buoy is asleep. The buoy can be powered for 10 years on the one battery. As an example, the buoy in sleep mode can be configured to enter sleep mode by software logic and can be awakened upon return of power, an alarm clock setting, or modem ring indication.

The embodied systems can use eight analog inputs (such as current or voltage inputs). The desired inputs can be picked by the software of the soft buoy.

A multifunction I/O point can be set up as (a) a digital input, a digital output, initializing off, initializing on, a low speed counter and a low speed counter of 0-10 kilohertz, a high speed counter of 125 Kilohertz to 400 kilohertz, a pulse output, a quadracure decoder.

When power is initially applied to a RTU the Factory Default; configuration retained in the buoy's flash memory is loaded to static RAM where it is executed. The active configuration in static RAM is the On-line configuration. This configuration allows immediate access to the buoy's I/O through the serial ports and the Modbus protocol on power-up. To setup the unit for an automation purpose the user can develop a configuration from a library of Function Blocks embedded in the RTU with the ARME configuration tool. Once loaded, this new configuration replaces the Factory Default and is called the User Default configuration.

In one example, the RTU can be a hardened industrial controller suitable for installation in environmentally exposed locations. The buoy's 32-bit Motorola 68332 processor, 256 Kbytes of battery backed Static RAM and 16 Mbytes of Flash RAM provide strong computing power to perform complex control and data management activities. The RTU can have three serial ports that can be used for communication with host computers, pagers, subordinate RTUs, I/O, analyzers and/or other vendor PLC's and the transceiver. Lastly, the RTU has 53 I/O points that can be interfaced to instruments and actuators to measure and effect changes to process or equipment status; and conditions.

The RTUs are designed to monitor and control assets in environmentally exposed installations and to receive supervision regarding that mission from a remotely located data center. As a result, flexible communication to data center computers is a key capability. The RTU can have three serial ports that can be individually configured for Master or Slave communications, different Modbus Slave IDs, communication parameters, hardware handshaking, password protection, privileges, and telemetry methods.

The RTU can be packaged with a metal mounting plate and cover. This packaging provides RFI protection but does not provide environmental protection from moisture, dust, corrosive chemicals and atmospheres.

An internal lithium back-up battery is provided in the RTU to maintain static RAM and the Real Time Clock when power is removed from the Power Input and Battery Input terminals. Current control set-points or targets, accumulated values and alarm thresholds that are being executed in static RAM may be different from those of the initial configuration maintained in flash RAM. The lithium battery, with a nominal life of 10 years, can maintain all of these settings in static RAM. A jumper may need to be installed on the buoy circuit board to activate the internal back-up battery.

The user can control power consumption in the buoy to a large extent. Under normal operating modes the RTU nominally draws 115 mA at 14 VDC from the Power Input source. This does not include the additional power draws of instrumentation, telemetry hardware or other devices that may be included in a buoy installation. The user can reduce this power consumption by putting the buoy in a sleep mode on an interval or on an event. This capability can be configured through the ARME. In the Sleep Mode the RTU draws 13 mA at 14 VDC from the Power Input Source. Finally, further reductions can be made by selectively or completely deactivating LED indications on the face of the buoy. Again this feature is configured through ARME.

Examples of Multifunction PO's that can be configured in the software include Digital Inputs (DI); Digital Outputs (DO); Low Speed Counters/Accumulator (LSC); High Speed Counters (HSC); Pulse Outputs (PO); Quadrature Decoder (QD); Pulse Width Modulation (PWM); DI Mode—5/12/24 VDC Sink; DO Mode—5/12/24 VDC Sink; HSC Mode—125 Hz to 100 KHz @ 5 to 36 VDC; LSC Mode—0 Hz to 10 kHz @ 5 VDC to 36 VDC; PO Mode 125 Hz to 100 kHz @ 5 VDC; and PWM Mode 125 Hz to 100 kHz Duty Cycle. Add-on modules can convert any of these I/O points to additional analog inputs, thermocouples inputs, RTD inputs, analog outputs, or combinations thereof.

Examples of digital points in the software and include Digital Inputs (DI) 5/12/24 VDC Sink; Digital Outputs (DO) 5/12/24 VDC Sink; LED indication for all Digital Points; Transient Protection; and Compliant with IEEE 472 and ANSI 37.90.

Examples of serial communication ports in the embodied systems include Port 1 EIA-232, full handshaking, DB-9 Male; Port 2 EIA-232/485, software selectable, full handshaking, DB-9 Male; Port 3 EIA-232/485, software selectable, full handshaking, DB-9 Male; LED indication of Port 2/3 EIA-485 mode; and LED indication of DTR, TX, RX, DCD, RTS, and CTS for each port.

Examples of power supply setting usable in the embodied systems include Three power modes: Un-powered, Sleep, Operational; Primary Power Input; Power Requirement 11-30 VDC; Operational Mode: Minimum power draw is 115 mA @ 14 VDC plus @ 1.8 mA/LED; Sleep Mode: Minimum power draw is 13 mA @ 14 VDC; LED indication when powered by Primary Power source; Back-up Battery Input; Power Requirement 9-30 VDC; and combinations thereof. In an operational mode, the minimum power draw is 102 mA @ 12 VDC plus @ 1.8 mA/LED.

Examples of master protocols supported by the embodied systems include Modbus ASCII and buoy; Daniels Modbus ASCII and buoy; Enron Modbus; Rosemount 3095 Modbus; Extended Modbus; Yokagawa Power Quality Monitor; and the like. Examples of slave protocols supported by the embodied systems include Modbus ASCII and buoy; Daniels Modbus ASCII and buoy; Enron Modbus; Extended Modbus; and the like.

Examples of other protocols modules supported by the embodied systems include Modbus Module; Modbus buoy and ASCII; Omni 3000/6000 Modbus (Real-time Data, and History and Report Uploads); Daniels Modbus buoy and ASCII (Real-time Data and History Uploads); Enron Modbus (Real-time Data and History Uploads); Flow Automation Modbus (Real-time Data and History Uploads); ABB Total-Flow Modbus (Real-time Data and History Uploads); Motorola MOSCAD Modbus; Delta X Modbus (Real-time Data and Dynagraph Cards); Baker CAC Modbus (Real-Time Data and Dynagraph Cards); User Configurable Register Sets; Bristol Babcock BSAP Module; ABB TotalFlow Packet (Native) Protocol Module (Real-time Data and History Uploads); ABB HCI-A Module (AAI Analyzers); Allen Bradley DF1 Module (both Master-Slave (Half Duplex) and Point-To-Point (Full Duplex)); Fisher ROC Module (ROC 300 Series, FloBoss 407, 500 Series) (Real-time Data and History Uploads); GE SNP Module; GE 90 Series PLC Ethernet Module; HP48000 Module (Real-time Data and History Uploads); Cutler Hammer—IMPACC System Communications Module; Detroit Diesel DDEC Module (Detroit Diesel Electronic Controller); General Motors EMD MDEC Module (Marine Diesel Electronic Controller); Caterpillar ECM Module (Electronic Controller Module); Nautronix ASK Module; Mercury ECAT, ER Module (Real-time Data and History Uploads); Teledyne CA, TGP Module; and the like.

For data acquisition, on power-up, all buoy I/Os can be accessible via EIA-232 and Modbus addressing with no programming required. In addition, data archival sampling rates can be configurable from seconds to hours and the buoy flash RAM available for data archival can store 365 days of hourly data for 24 points or over 250,000 records.

The embodied systems allow numerous function blocks that can be configured to address control, data acquisition, data logging or alarm applications. Examples of these function blocks include Accumulator/Totalizer Block; AGA Block Compressible Fluid; Incompressible Fluid; AGA 3; AGA 8 Detailed; AGA 8 Gross 1; AGA 8 Gross 2; AGA 7; Alternate Block; Analog Alarm Block; Analog Input Block; Archive Block; Boolean/Math Block; Cryout Block; Digital Alarm Block; LCD Block; Mapping Block; Momentary Block; On/Off Control Block; PID Control Block; Scale Block; Staging Block; Sleep Block; Stop Watch Block; System Block; Timer BlockValve Block; User definable Function Blocks via Soft buoy Toolkit; and the like.

The embodied enterprise server can include on-line configuration supports non-stop communication with field devices. The embodied enterprise server can provide real-time data polling, archival data uploads from field devices, and exception reports or cryouts from field devices. The embodied enterprise server can have remote administration supported and can have embedded diagnostics logs performance information and forensics data to ASI Viewer and/or Log File. Most communication functions and controls in the embodied enterprise server are accessible to external applications through the OPC Server interface. The embodied enterprise server can include embedded client triggers and can be browsed using protocol specific data types/items and aliases. The embodied enterprise server can support multiple protocols on a single communication channel. The embodied enterprise server can enables real-time data caching for OPC Client applications. The embodied enterprise server can include automatic archived data uploads from field devices without OPC Client application and can support item aliases for protocol independent HMI/Client Application development.

Examples of server interface formats supported by the embodied systems include OPC (OLE™ for Process Control); Microsoft CF_TEXT, X1Table; Rockwell Software AdvanceDDE™; Wonderware FastDDE™; and the like.

Examples of telemetry methods usable with the embodied system include serial cable, leased-line, serial, ulti-drop, PSTN via modem, PPP via modem, radio (such as, conventional, trunking, and spread-spectrum radio), VSAT, TCP/IP Ethernet, TCP/IP Ethernet Terminal Servers, IP, and the like.

Examples of communication transactions supported by the embodied systems include Real-time Data; Interval Polling at 15 different intervals (Periodic Timer Triggered); Slow Polls at 15 Intervals are a percentage of Polling Interval (Faster and Slower rates are supported); Synchronous Polling (Clock or Calendar Triggered); Demand Polling (DDE/OPC Client Triggered); History/Archived data Uploads; Interval Uploads at 15 different intervals (Periodic Timer Triggered); Slow Uploads at 15 Intervals are a percentage of Polling Interval (Faster and Slower rates are supported); Synchronous Uploads (Clock or Calendar Triggered); and the like.

As for documentation and configuration, the embodied systems allow for OLE DB interface support for all leading relational databases. Database driven external configuration tools can be incorporated to ease maintenance of large applications. Database driven reports can be created to document AES configuration. Database tools to support simultaneous configuration of HMI/Client Application and AES can be included in the embodied systems.

The embodied systems allow for client access to communication diagnostics for each telemetry channel and for each buoy. The embodied systems allow for one AES installation to support multiple protocols, wherein multiple protocols can be supported over one communication channel. The embodied systems can include a client-server interface to give a client full control of all aspects of the server including polling interval, demand polling, and telephone numbers for dial-up. The embodied systems allow for automatic fail-over to back-up device.

The embodied systems allow for data logging. For example, uploaded data can be logged to any leading database via OLE DB and EFM data uploads can be written to Flow Cal files or to Flow Cal Enterprise (Oracle) format. The embodied systems allow for user defined periodic file closing to control file size; user defined path to file location; user defined directory and file labels identify file content, date and time; and user defined automatic file purging: directory size control.

The embodied systems allow for diagnostic logging. For example, AES logs diagnostic and forensic data can be logged to an ASI Viewer and/or Log file. Examples of data that can be activated for diagnostic logging includes Message Errors; Send Messages; Receive Messages; Device and Item Activity; Status Changes; Client Data Received; Field Device Data Received; Event Notification from Ports; Receive Buffer Contents and Data; Item Name, Value and Quality; Changes in Client Status; Changes in AES Configuration; Data Flow Between AES Components; Performance Data regarding Threads; AES Footprint or Tracing Information; and the like.

The embodied systems provide control, alarm monitoring, data logging, data acquisition, and communication functions of the embedded softbuoy implemented using ARME. Through the embodied systems, data acquisition is available immediately on power-up without configuring or programming. The systems can utilize a fill-in-the-blank configuration interface that is used to setup buoy functions without programming. The embodied systems allow the buoys to be reconfigured while on-line. The embodied systems allow for new configurations to be loaded over the telemetry system and allow for buoy configurations to be uploaded and modified for downloading to other buoys. The embodied systems provide a configuration to archive data for periods greater than one year to nonvolatile memory. The embodied systems allow for the synchronization of utilities between the buoy and the host computer.

While these embodiments have been described with emphasis on the embodiments, it should be understood that within the scope of the appended claims, the embodiments might be practiced other than as specifically described herein.

What is claimed is:

1. A system of detecting tsunami conditions using communications for a supervisory control and data acquisition system, wherein the system comprises:
   a. an enterprise server;
   b. a plurality of buoys, wherein each buoy comprises a remote terminal unit, wherein the remote terminal unit comprises a sensor that collects information on oceanic conditions and the remote terminal unit stores digital data representative of the information in a memory area for transmission, and wherein each remote terminal unit further comprises:
  i. an analog-to-digital converter for converting the information into the digital data representative of the information;
  ii. a processor in communication with the analog-to-digital converter and the memory area, wherein the processor operates upon the digital data according to a predetermined function, and wherein the processor selectively moves the digital data to the memory area;
  iii. a command register for storing communication commands, wherein the command register is in communication with the processor such that the processor moves the digital data to the memory area when the command register contains an enabling communication command; and
  iv. a bidirectional port in communication with a communication software and the enterprise server for transmitting the digital data to the enterprise server from the remote terminal unit via the communication software, wherein the bidirectional port receives the digital data from the communication software such that the processor reconfigures the remote terminal unit;
c. wherein the communication software links the enterprise server with the plurality of buoys, and is adapted to simultaneously handle multiple types of telemetry and different protocols associated with the plurality of buoys, wherein the communication software collects the information on oceanic conditions from the plurality of buoys, and wherein the communication software initiates an alarm when the information signifies tsunami conditions; and
d. a configuration software for configuring and reconfiguring the remote terminal unit using configuration commands, wherein the configuration commands are communicated using the communication software.

2. The system of claim 1, wherein the information on oceanic conditions comprises a member selected from the group consisting of water pressure, water temperature, salinity, pollutant concentration, velocity and direction of water currents, and combinations thereof.

3. The system of claim 1, wherein the sensor is a pressure sensor, temperature sensor, salinity sensor, anemometer or combination thereof.

4. The system of claim 1, wherein the communication software continues communicating with each buoy while a second enterprise server is added to the system.

5. The system of claim 1, wherein the communication software continues communicating with each buoy while a second enterprise server is removed from the system.

6. The system of claim 1, wherein the communication software continues communicating with each buoy while a new buoy is added to the system.

7. The system of claim 1, wherein the communication software continues communicating with each buoy while an existing buoy is removed from the system.

8. The system of claim 1, wherein the communication software transmits the communication commands and executing reconfiguration commands to a transceiver of each buoy.

9. The system of claim 1, wherein each buoy further comprises a transceiver.

10. The system of claim 9, wherein each buoy further comprises a second transceiver, wherein the transceiver enables the least one remote terminal unit to communicate with the enterprise server, and wherein the second transceiver enables the remote terminal unit to communicate with a second remote terminal unit.

11. The system of claim 1, wherein each buoy is in communication with the communication software through a member selected from the group consisting of a satellite signal, an acoustic signal, a radio frequency, and combinations thereof.

12. The system of claim 1, wherein the remote terminal unit continues to collect information while receiving communication commands and executing reconfiguration commands from the communication software.

13. The system of claim 1, wherein each remote terminal unit further comprises software that includes a generic encapsulation layer and automation software.

14. The system of claim 1, further comprising a submersible buoy adapted to protect a second remote terminal unit from the oceanic bottom environment, and wherein the submersible buoy comprises a transceiver, and wherein the transceiver enables the second remote terminal unit to communicate with the remote terminal unit in the buoy.

* * * * *